(12) United States Patent
Han et al.

(10) Patent No.: US 11,671,300 B2
(45) Date of Patent: Jun. 6, 2023

(54) DISCRETE FOURIER TRANSFORM SPREAD ORTHOGONAL TIME FREQUENCY SPACE MODULATION METHOD

(71) Applicant: SHANGHAI JIAOTONG UNIVERSITY, Shanghai (CN)

(72) Inventors: Chong Han, Shanghai (CN); Yongzhi Wu, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 0 days.

(21) Appl. No.: 17/807,320

(22) Filed: Jun. 16, 2022

(65) Prior Publication Data

US 2023/0016587 A1    Jan. 19, 2023

(30) Foreign Application Priority Data

Jul. 19, 2021    (CN) .......................... 202110812760.2

(51) Int. Cl.
  *H04L 27/26*    (2006.01)
  *H04L 27/01*    (2006.01)
  *H04L 1/00*    (2006.01)

(52) U.S. Cl.
  CPC ........ *H04L 27/2628* (2013.01); *H04L 1/0042* (2013.01); *H04L 27/01* (2013.01); *H04L 27/2614* (2013.01)

(58) Field of Classification Search
  CPC ..... H04L 1/0042; H04L 1/0612; H04L 27/01; H04L 27/2614; H04L 27/2628; H04L 27/2634; H04L 27/2636; H04L 27/2639; H04L 27/26524; H04L 27/26526; H04L 27/26532
  See application file for complete search history.

(56) References Cited

U.S. PATENT DOCUMENTS

2020/0389268 A1*    12/2020    Sathyanarayan ... H04L 27/0008

* cited by examiner

*Primary Examiner* — David S Huang
(74) *Attorney, Agent, or Firm* — CBM Patent Consulting, LLC

(57) ABSTRACT

A discrete Fourier transform spread orthogonal time frequency space modulation method comprises the steps of performing DFT preceding processing and delay-Doppler domain mapping processing on the transmit data symbols, OTFS modulator, and performing delay-Doppler domain demapping processing and IDFT decoding processing on a received signal to realize demodulation; compared with the existing waveforms, including OFDM and DFT-s-OFDM, the proposed DFT-s-OTFS can reduce the bit error rate under high Doppler spread and the peak-to-average power ratio of the transmitted signal at the same time.

7 Claims, 5 Drawing Sheets

DISCRETE FOURIER TRANSFORM SPREAD ORTHOGONAL TIME FREQUENCY SPACE MODULATION METHOD

CROSS REFERENCES

This application claims priority to Chinese Patent Application Ser. No. CN202110812760.2 filed on 19 Jul. 2021.

TECHNICAL FIELD

The invention relates to the technical field of Terahertz communication, specifically, a discrete Fourier transform spread orthogonal time frequency space modulation method and system for millimeter wave and Terahertz wireless communication.

BACKGROUND OF THE INVENTION

Existing orthogonal frequency division multiplexing (OFDM) and discrete Fourier transform (DFT) spread OFDM (DFT-s-OFDM) are not robust to fast time-varying channels with high Doppler spread, which may lead to inter-carrier interference (ICI) and severely degrade link performance. As the carrier frequency increases, the Doppler spread effect in the THz frequency band becomes more severe compared to the microwave frequency band. If the waveform and numerology in current commercial mobile systems are maintained for THz mobile communications, data rate and bit error rate (BER) performance will be severely deteriorated. Secondly, when the operating frequency is increased, the saturation output power of the power amplifier (PA) rapidly decreases, even reduces to less than 10 dBm in the THz band. The THz transmitter requires that the transmit signal has a lower peak-to-average power ratio (PAPR) to maximize the transmit power and energy efficiency of the power amplifier for the THz transmitters. Furthermore, the performance of the THz wireless link becomes substantially sensitive to the radio frequency front-end impairments at the THz transceivers, such as phase noise (PN) at the local oscillator (LO) and nonlinear distortion of the PA.

SUMMARY OF THE INVENTION

Compared with existing waveforms, OFDM and DFT-S-OFDM, DFT-s-OTFS can reduce the bit error rate under high Doppler spread while reducing the peak-to-average power ratio of the transmitted signal.

The present invention is implemented by the following technical solutions:

The invention relates to a discrete Fourier transform spread orthogonal time frequency space modulation method for millimeter wave and Terahertz wireless communication. Transmit data symbols are first operated by DFT preceding processing and delay-Doppler domain mapping processing, then an OTFS modulator is introduced at the transmitter, and meanwhile, the received signals are equalized, and delay-Doppler domain demapping processing and IDFT decoding processing are performed to realize demodulation.

The DFT precoding processing specifically refers to performing DFT operation along the Doppler axis in the delay-Doppler domain:

$$\tilde{x}[kL + n, l] = \frac{1}{\sqrt{L}} \sum_{a=0}^{L-1} x[kL + a, l] e^{-j2\pi \frac{an}{L}},$$

where L is a DFT precoding size, x is an N×M transmission data frame, M is the number of subcarriers, N is the number of symbols, $\tilde{x}$ is the delay-Doppler domain signal, k=0,1, ..., K−1, n=0,1, ..., L−1, l=0,1, ..., M−1, K is the number of users.

The delay-Doppler domain mapping processing specifically refers to:

$$\bar{x}[aL + n, l] = \begin{cases} \tilde{x}[n, l], & \text{if } a = k \\ 0, & \text{others} \end{cases}$$

for an uplink and $\bar{x}[a, l] = \tilde{x}[kL+n, l]$ used for a downlink when a=kL+n, where: $\bar{x}$ is the mapped signal.

The OTFS modulator generates the transmit signal, $$s(t) = \frac{1}{\sqrt{M}} \sum_{n=0}^{N-1} \sum_{m=0}^{M-1} X[n, m] g_{tx}(t - nT) e^{j2\pi m \Delta f(t-nT)},$$

where X[n,m] is obtained by performing an inverse symplectic finite Fourier transform (ISFFT), $$X[n, m] = \frac{1}{\sqrt{MN}} \sum_{n=0}^{N-1} \sum_{m=0}^{M-1} \bar{x}[a, l] e^{j2\pi \left(\frac{na}{N} - \frac{ml}{M}\right)},$$

where n is the row index, m is the column index, $g_{tx}(t)$ is a transmit pulse, T is the symbol duration, and $\Delta f$ is the subcarrier spacing.

The delay-Doppler domain demapping processing specifically refers to: $\tilde{y}[kL+n,l]=\bar{y}[a, l]$ when a=kL+n, where $\bar{y}$ denotes the delay-Doppler domain received signal obtained by using symplectic finite Fourier transform (SFFT), $\tilde{y}$ stands for the delay-Doppler domain demapping signal.

The IDFT decoding processing means that:

$$\hat{x}[kL + n, l] = \frac{1}{\sqrt{L}} \sum_{a=0}^{L-1} \tilde{y}[kL + a, l] e^{j2\pi \frac{an}{L}},$$

k=0, 1, ..., K−1, l=0, 1, ... M−1, $\hat{x}$ is a received data frame.

The improved DFT-S-OTFS signal is detected in the following way:

Step 1: The receiver estimates a channel matrix H after obtaining the delay-Doppler domain received signal $\bar{y}$.

Step 2: Perform single-tap equalization on the received signal, $$\bar{x}' = \text{diag}\left(\frac{1}{H_0}, \frac{1}{H_1}, \ldots, \frac{1}{H_{MN}-1}\right),$$

where: diag (•) represents the operation that transforms a vector into a diagonal matrix, and $H_i$ is the i-th diagonal element of the channel matrix H.

Step 3, initializing the signal after the single-tap equalization by using the gradient descent algorithm, and then iteratively updating the delay-Doppler domain signal, $\bar{x}':= \bar{x}'-\eta\nabla f$, where $\eta$ is the learning rate, and the stepping amplitude $\nabla f = H^H(H\bar{x}'-\bar{y})+\sigma^2\bar{x}'$, $\sigma^2$ is the signal-to-noise ratio of the received signal, so as to obtain the equalized delay-Doppler domain signal $\bar{x}'$.

Step 4: Perform demapping, IDFT operation and detection on the delay-Doppler domain signal x̄' to obtain the transmit data symbols.

Technical Effect

The present invention solves the problem of high peak-to-average power ratio (PAPR) of OTFS in the prior art. According to the present invention, the peak-to-average power ratio of the transmitted signal can be effectively reduced, the power amplifier efficiency of the transmitter can be improved. Compared with the OFDM/DFT-S-OFDM technology, the robustness to the Doppler channel can be improved, and the bit error rate through the fast time-varying channel is reduced.

DETAILED DESCRIPTION OF THE INVENTION

Figure 1:
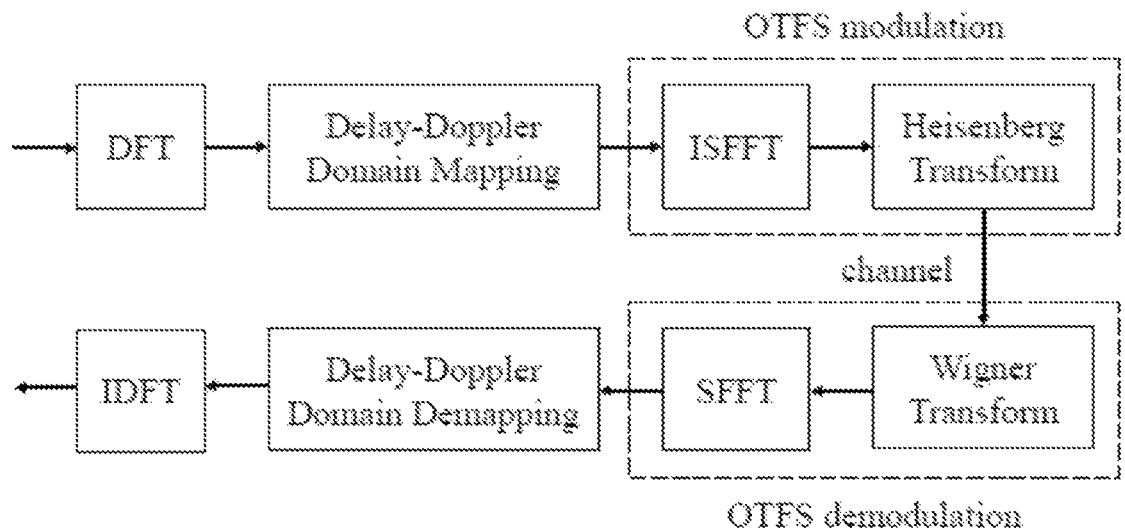
FIG. 1 is the system block diagram of the present invention.

As shown in FIG. 1, this embodiment relates to a discrete Fourier transform spread orthogonal time frequency space communication system, comprising: a DFT precoding unit, a delay-Doppler domain mapping unit, an OTFS modulator, an OTFS demodulator, a time delay Doppler domain equalizer, a time delay Doppler domain demapping unit, and an IDFT decoding unit, wherein the DFT precoding unit is connected to the delay-Doppler domain mapping unit and transmits a DFT precoding delay-Doppler domain signal, the delay-Doppler domain mapping unit is connected to the OTFS modulator and transmits the mapped delay-Doppler domain modulation signal, and the OTFS modulator generates a time domain transmit signal and then is connected to the wireless channel and transmits the signal. After receiving the signal, the received side obtains the delay-Doppler domain received signal through the OTFS demodulator, recovers the delay-Doppler domain transmission signal through the delay-Doppler domain equalizer, and obtains the transmit information symbols through the delay-Doppler domain de-mapping unit and the IDFT decoding unit.

The present embodiment relates to a method for detecting the DFT-S-OTFS signal based on the above system, comprising the following steps:

In step 1, the transmitter performs DFT precoding before the OTFS modulation, then sequentially performs delay-Doppler domain mapping and OTFS modulation, modulates the data frame into a time domain transmit signal and transmits through a wireless channel.

Step 2: After receiving the wireless signal, the receiver demodulates the radio signal to obtain a delay-Doppler domain received data frame.

Step 3: Equalization is performed on the time-delay Doppler domain received data frame to obtain a delay-Doppler domain transmission data frame and perform time-delay Doppler domain demapping and IDFT decoding to obtain transmission data.

Figure 2:
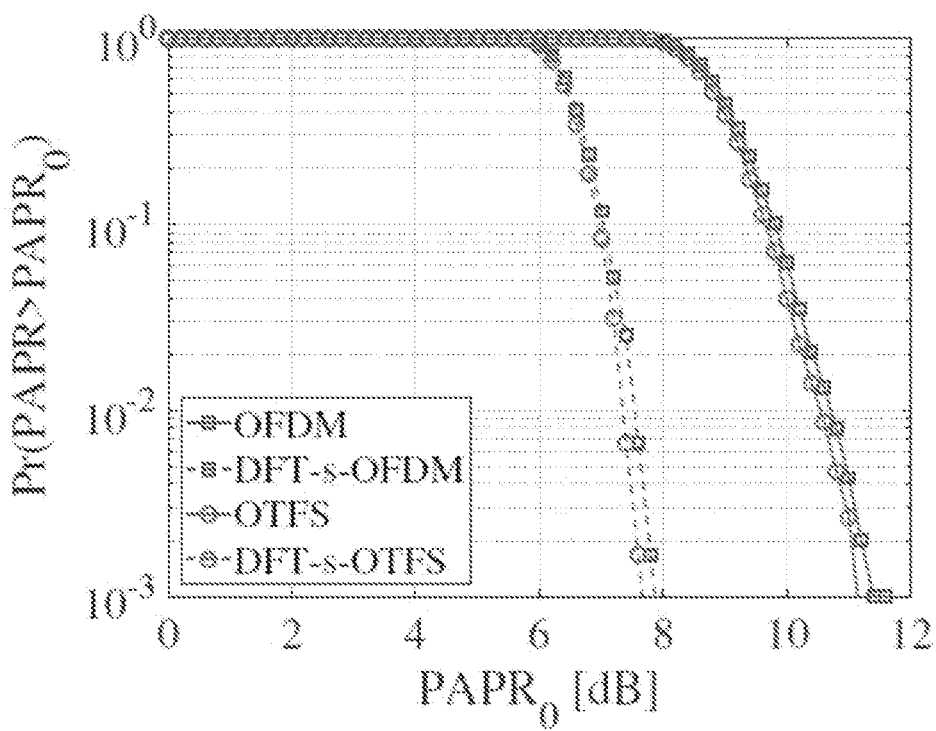
FIG. 2 shows results of one of examples.
Figure 3:
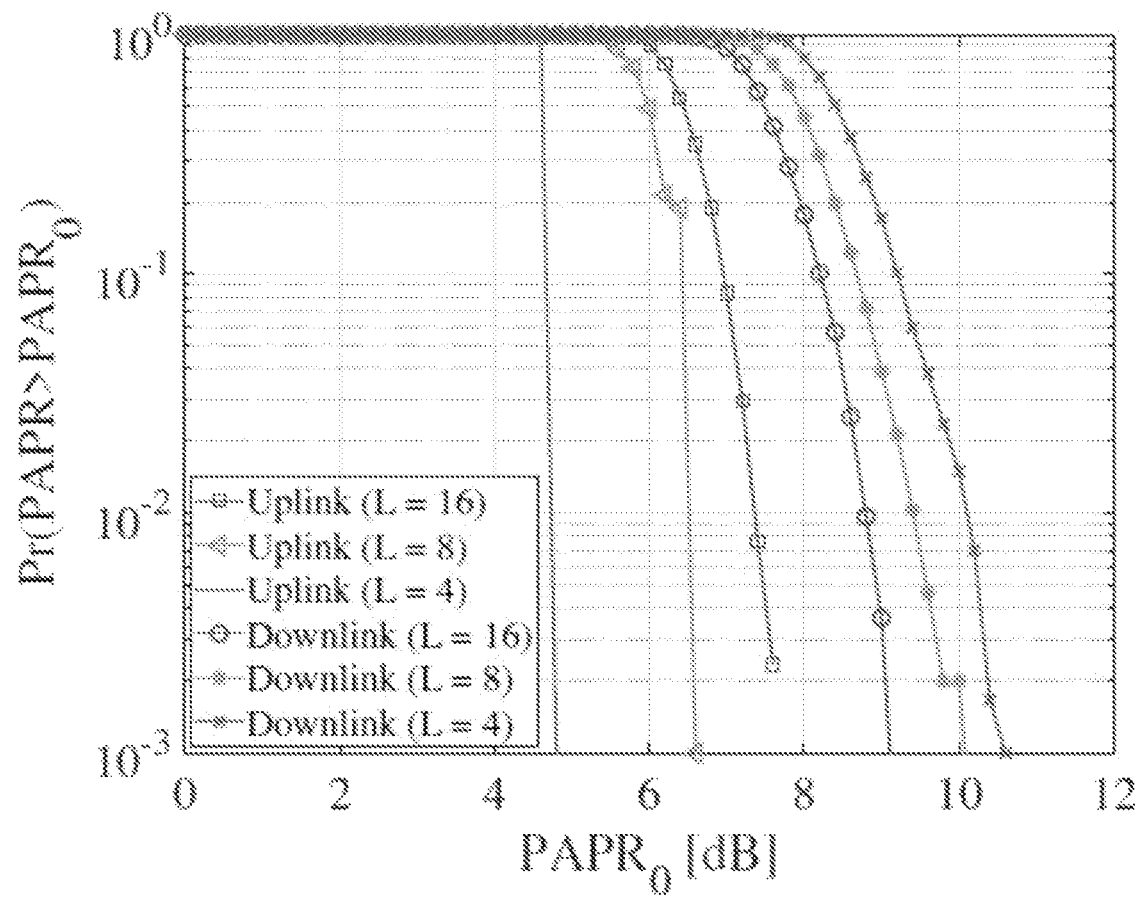
FIG. 3 shows results of one of examples.

In a specific practical experiment, under the setting of the simulation environment of MATLAB, the above method is performed by using a carrier frequency of 0.3 THz, a subcarrier spacing of 1.92 MHz and a DFT precoding length as half of the number of symbols, and first evaluates the PAPR by comparing the DFT-S-OTFS transmit signal and other waveforms. The performance indicator is the complementary cumulative distribution function (CCDF) of PAPR, that is, Pr (PAPR>PAPR$_0$). This embodiment uses a rectangular pulse as the transmit pulse of all waveforms. The number of subcarriers and symbols of each data frame is 64 and 32, respectively. The DFT precoding sizes of DFT-s-OFDM and DFT-s-OTFS are 32 and 16. In FIG. 2, since different waveforms are sorted as DFT-S-OTFS≈DFT-S-OFDM<OTFS≈OFDM. In particular, the PAPR value of DFT-S-OTFS is approximately 3 dB lower than OTFS at the CCDF of 1%. When N<M, the DFT-S-OTFS has a slightly better PAPR compared to DFT-s-OFDM, which demonstrates the good PAPR characteristics of the DFT-s-OTFS waveform. As shown in FIG. 3, for evaluating the PAPR of the DFT-S-OTFS, different DFT precoding sizes are used for the uplink and downlink. The uplink has a lower PAPR compared to the downlink according to the simulation results. Meanwhile, the PAPR of the uplink DFT-S-OTFS is reduced when the smaller DFT precoding size L is used. However, the PAPR of the downlink DFT-S-OTFS becomes higher when L decreases.

Figure 4:
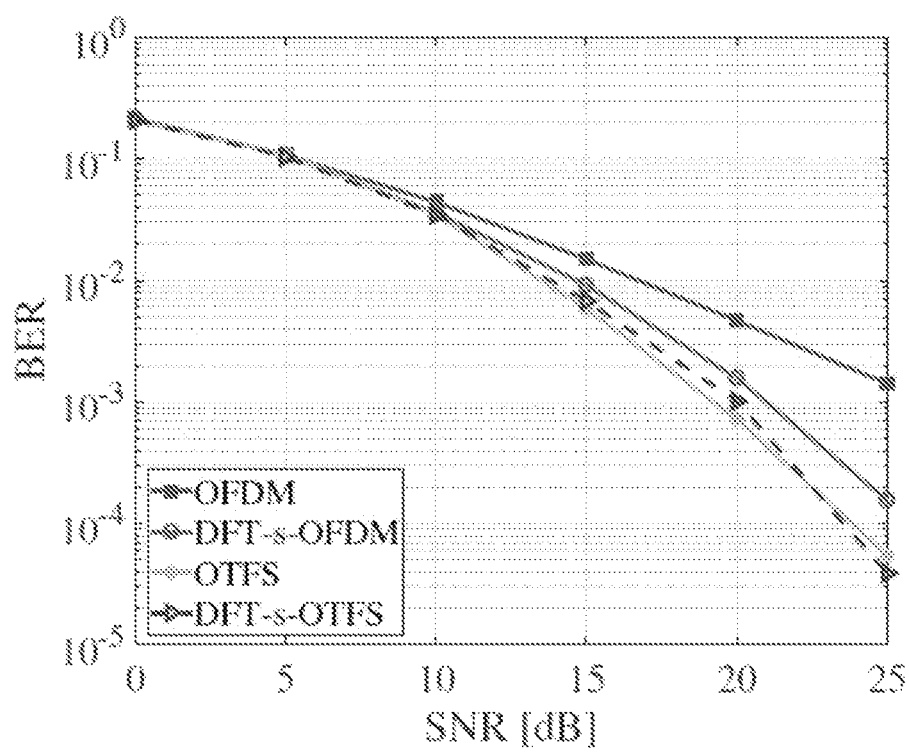
FIG. 4 shows results of one of examples.
Figure 5:
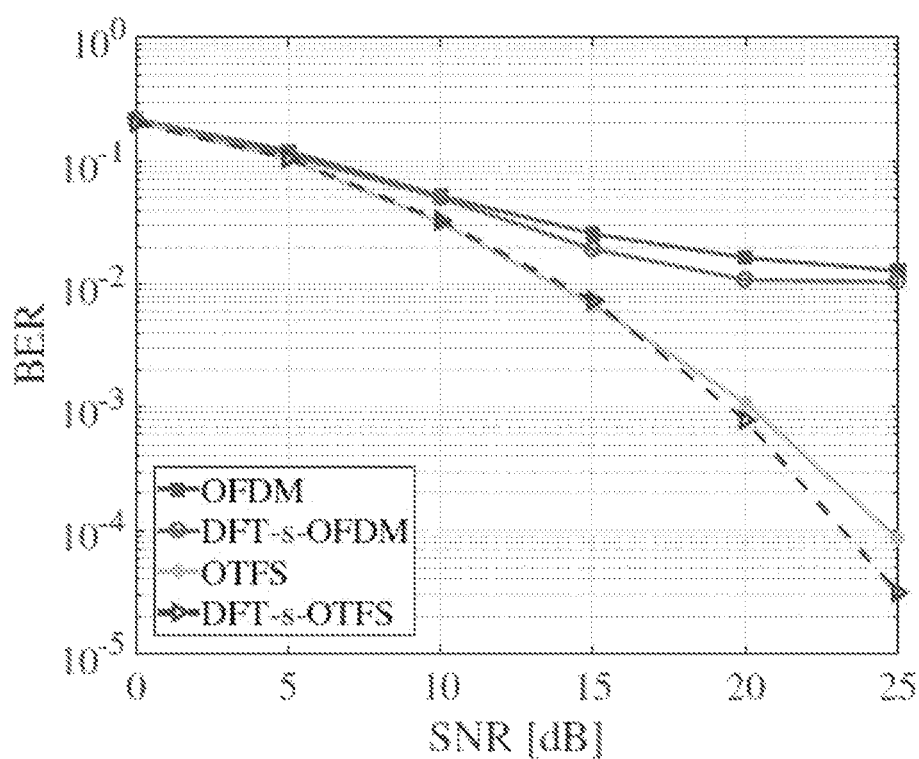
FIG. 5 shows results of one of examples.

The bit error rate performance of the DFT-S-OTFS: taking a 3-tap Terahertz channel model as an example, the size of the data frame is 8×16. As shown in FIG. 4, the bit error rate result in absence of Doppler spread is evaluated, wherein OFDM and DFT-S-OFDM use a single-tap frequency domain equalization, and the MMSE equalization algorithm is performed for OTFS and DFT-S-OTFS. The results show that the OTFS and DFT-S-OTFS can obtain better bit error rate performance in absence of Doppler spread effects. As shown in FIG. 5, when the Doppler spread is equal to $$\frac{2\Delta f}{N},$$

the bit error rate of the OFDM and DFT-S-OFDM is $10^{-2}$, while the performance of OTFS and DFT-S-OTFS is not degraded. In addition, the DFT-S-OTFS is slightly better than the OTFS under the fast time-varying channel. Thus, the DFT-S-OTFS waveform can utilize the advantages of OTFS channel estimation and equalization and maintain the same bit error rate performance as OTFS. When there is no Doppler spread effect, the bit error rate performance of the DFT-S-OTFS is increased by one order of magnitude compared to OFDM, and when the stronger Doppler spread effect exists, the bit error rate performance of the DFT-S-OTFS is increased by two orders of magnitude in contrast with OFDM/DFT-S-OFDM.

Figure 6:
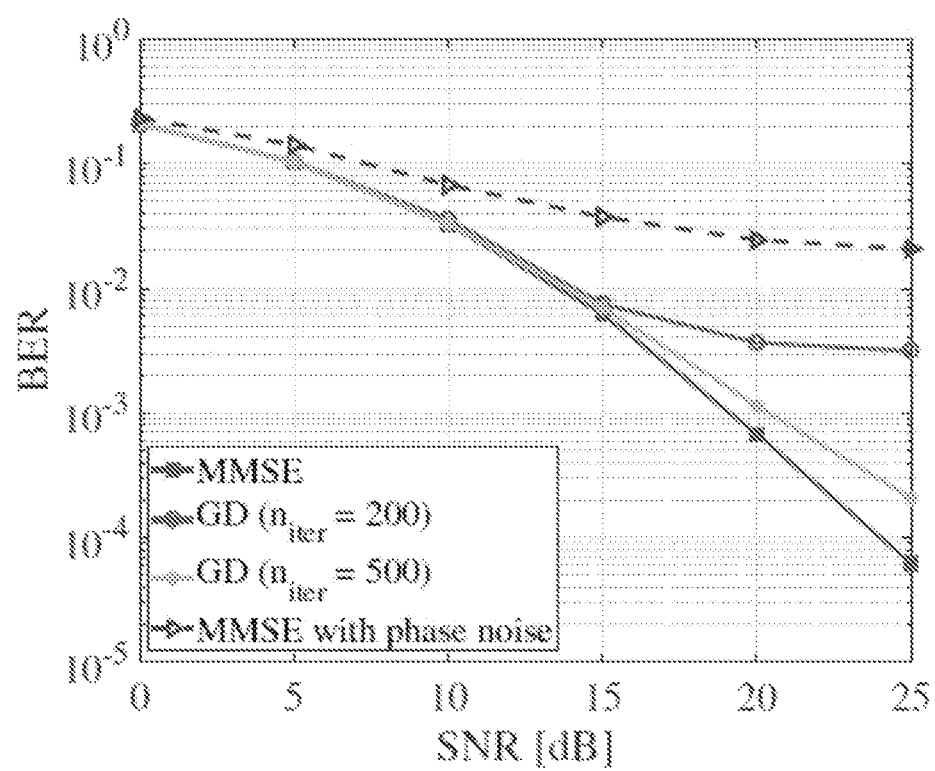
FIG. 6 shows results of one of examples.

Further, the influence of the detection algorithm and the effect of phase noise on the performance of the DFT-S-OTFS bit error rate are investigated. As shown in FIG. 6, using a gradient descent-based detection algorithm, the number of iterations is increased so that the bit error rate becomes closer to MMSE equalization. Furthermore, if there is stronger phase noise in the terahertz band, such as phase noise parameter $\sigma_\theta^2 = 2 \times 10^{-3}$, the bit error rate of the DFT-S-OTFS is degraded by two orders of magnitude at a signal-to-noise ratio of 25 dB without phase noise.

In conclusion, compared with the prior art, the proposed method can reduce the PAPR by about 3 dB compared with the OTFS, and can improve the bit error rate performance by two orders of magnitude compared with OFDM-DFT-S-OFDM in the presence of stronger Doppler spread effect.

The above specific implementation may be locally adjusted by a person skilled in the art without departing from the principle and spirit of the present disclosure, and the protection scope of the present disclosure is subject to the claims and is not limited by the specific embodiments described above, and various implementations within the scope of the present disclosure are not limited by the present disclosure.

What is claimed is:

1. A method for preparing a discrete Fourier transform spread orthogonal time-frequency space modulation for millimeter wave and Terahertz wireless communication, the method comprising:
   a transmission process, by a transmitter comprising
     DFT precoding;
     delay-Doppler domain mapping;
     OTFS modulating, to modulate a data frame from the mapping into a time domain transmission signal; and
     transmitting the transmission signal, by the transmitter, through a wireless channel; and
   a receiving process, by a receiver, comprising
     receiving the transmission signal,
     performing equalization, on the received transmission signal to obtain a delay-Doppler domain transmission data frame; and
     performing delay-Doppler domain de-mapping and IDFT decoding on the delay Doppler domain transmission data frame to obtain transmit data symbols;
   wherein DFT precoding process specifically refers to DFT operation along the Doppler axis in the time delay Doppler domain:

$$\tilde{x}[kL+n, l] = \frac{1}{\sqrt{L}} \sum_{a=0}^{L-1} x[kL+a, l] e^{-j2\pi \frac{an}{L}},$$

where L is a DFT precoding size, x is an N×M transmission data frame, M is the number of subcarriers, N is the number of symbols, $\tilde{x}$ is the delay-Doppler domain signal, k=0,1, ..., K−1,n=0,1, ..., L−1,l=0,1, ..., M−1,K is the number of users.

2. The method according to claim 1, wherein the delay-Doppler domain mapping processing specifically refers to:

$$\bar{x}[aL+n, l] = \left\{ \begin{array}{l} \tilde{x}[n, l], \text{ if } a = k \\ 0, \text{ others} \end{array} \right\}$$

for an uplink and $\bar{x}[a,l]=\tilde{x}[kL+n,l]$ used for a downlink when a=, where: $\bar{x}$ is the mapped signal.

3. The said method according to claim 1, wherein the time domain transmission signal is an improved DFT-S-OTFS signal $$s(t) = \frac{1}{\sqrt{M}} \sum_{n=0}^{N-1} \sum_{m=0}^{M-1} X[n, m] g_{tx}(t - nT) e^{j2\pi m \Delta f (t-nT)},$$

where X[n,m] is obtained by performing an inverse symplectic finite Fourier transform (ISFFT), $$X[n, m] = \frac{1}{\sqrt{MN}} \sum_{a=0}^{N-1} \sum_{m=0}^{M-1} \bar{x}[a, l] e^{j2\pi \left( \frac{na}{N} - \frac{ml}{M} \right)},$$

where n is the row index, m is the column index, $g_{tx}(t)$ is a transmit pulse, T is the symbol duration, and Δf is the subcarrier spacing.

4. The method according to claim 3, wherein the improved DFT-S-OTFS signal is detected in the following way:
   Step 1: the receiver estimates a channel matrix H after obtaining the delay-Doppler domain received signal $\bar{y}$;
   Step 2: perform single-tap equalization $$\bar{x}' = \text{diag}\left( \frac{1}{H_0}, \frac{1}{H_1}, \ldots, \frac{1}{H_{MN-1}} \right)$$

on the received signal, where: diag(•) represents the operation that transforms a vector into a diagonal matrix, and $H_i$ is the i-th diagonal element of the channel matrix H;
   Step 3, initializing the signal after the single-tap equalization by using the gradient descent algorithm, and then iteratively updating the delay-Doppler domain signal $\bar{x}':=\bar{x}'-\eta\nabla f$, where η is the learning rate, and the stepping amplitude $\nabla f=H^H(H\bar{x}'-\bar{y})+\sigma^2\bar{x}'$, $\sigma^2$ is the signal-to-noise ratio of the received signal $\bar{x}'$, so as to obtain the equalized delay-Doppler domain signal; and
   Step 4: perform demapping, IDFT operation and detection on the delay-Doppler domain signal $\bar{x}'$ to obtain the transmit data symbols.

5. The method according to claim 1, wherein the delay-Doppler domain demapping processing specifically refers to: $\hat{y}[kL+n,l]=\bar{y}[a,1]$ when a=kL+n, where $\bar{y}$ denotes the delay-Doppler domain received signal obtained by using symplectic finite Fourier transform (SFFT), $\bar{y}$ stands for the delay-Doppler domain demapping signal.

6. The method according to claim 1, wherein the IDFT de-coding processing means that $$\hat{x}[kL+n, l] = \frac{1}{\sqrt{L}} \sum_{a=0}^{L-1} \hat{y}[kL+a, l] e^{j2\pi \frac{an}{L}},$$

in which k=0,1, ..., K−1,l=0,1, ... M−1,$\hat{x}$ is a received data frame.

7. A system for implementing discrete Fourier transform spread orthogonal time frequency space modulation, the system comprising:
   a transmitter comprising:
     a DFT precoding unit that outputs a DFT precoding delay-Doppler domain signal
     a delay-Doppler domain mapping unit connected to the DFT precoding unit, that outputs the mapped delay-Doppler domain modulation signal; and
     an OTFS modulator, connected to the delay-Doppler domain mapping unit, that generates a time domain transmit signal, and transmits the signal on a wireless channel; and
   a receiver comprising:
     an OTFS demodulator, that obtains a delay-Doppler domain received signal, a time delay Doppler domain equalizer, that recovers the delay-Doppler domain transmission signal; and a delay Doppler domain demapping unit, and an IDFT decoding unit, that obtain the transmit information symbols;

wherein DFT preceding process specifically refers to DFT operation along the Doppler axis in the time delay Doppler domain:

$$\tilde{x}[kL+n, l] = \frac{1}{\sqrt{L}} \sum_{a=0}^{L-1} x[kL+a, l] e^{-j2\pi \frac{an}{L}},$$

where L is a DFT preceding size, x is an N×M transmission data frame, M is the number of subcarriers, N is the number of symbols, $\tilde{x}$ is the delay-Doppler domain signal, k=0,1, ..., K−1, n=0,1, ..., L−1, l=0,1, ..., M−1, K is the number of users.

* * * * *